United States Patent [19]
Camp

[11] 4,228,650
[45] Oct. 21, 1980

[54] SIMULATED PARAMETER CONTROL FOR GAS TURBINE ENGINE

[75] Inventor: Vann T. Camp, Jupiter, Fla.

[73] Assignee: United Technologies Corporation, Hartford, Conn.

[21] Appl. No.: 901,898

[22] Filed: May 1, 1978

[51] Int. Cl.³ .............................................. F02C 9/00
[52] U.S. Cl. ......................... 60/39.09 R; 60/39.28 R
[58] Field of Search ............... 60/39.09 R, 39.28 R; 364/578, 803

[56] References Cited

U.S. PATENT DOCUMENTS

| 2,641,105 | 6/1953 | Drake | 60/39.09 R |
|---|---|---|---|
| 2,809,492 | 10/1957 | Arkaway | 60/39.28 R |
| 3,025,670 | 3/1962 | Russ | 60/39.28 R |
| 3,851,157 | 11/1974 | Ellis | 364/110 |
| 4,058,975 | 11/1977 | Gilbert et al. | 60/39.28 R |
| 4,122,667 | 10/1978 | Hosaka et al. | 60/39.09 R |

Primary Examiner—Louis J. Casaregola
Attorney, Agent, or Firm—Norman Friedland

[57] ABSTRACT

For a failure of a sensor utilized in the controls for a gas turbine engine, calculations from other parameters based on the thermodynamics of the cycle serve to simulate the value otherwise manifested by the failed sensor.

4 Claims, 2 Drawing Figures

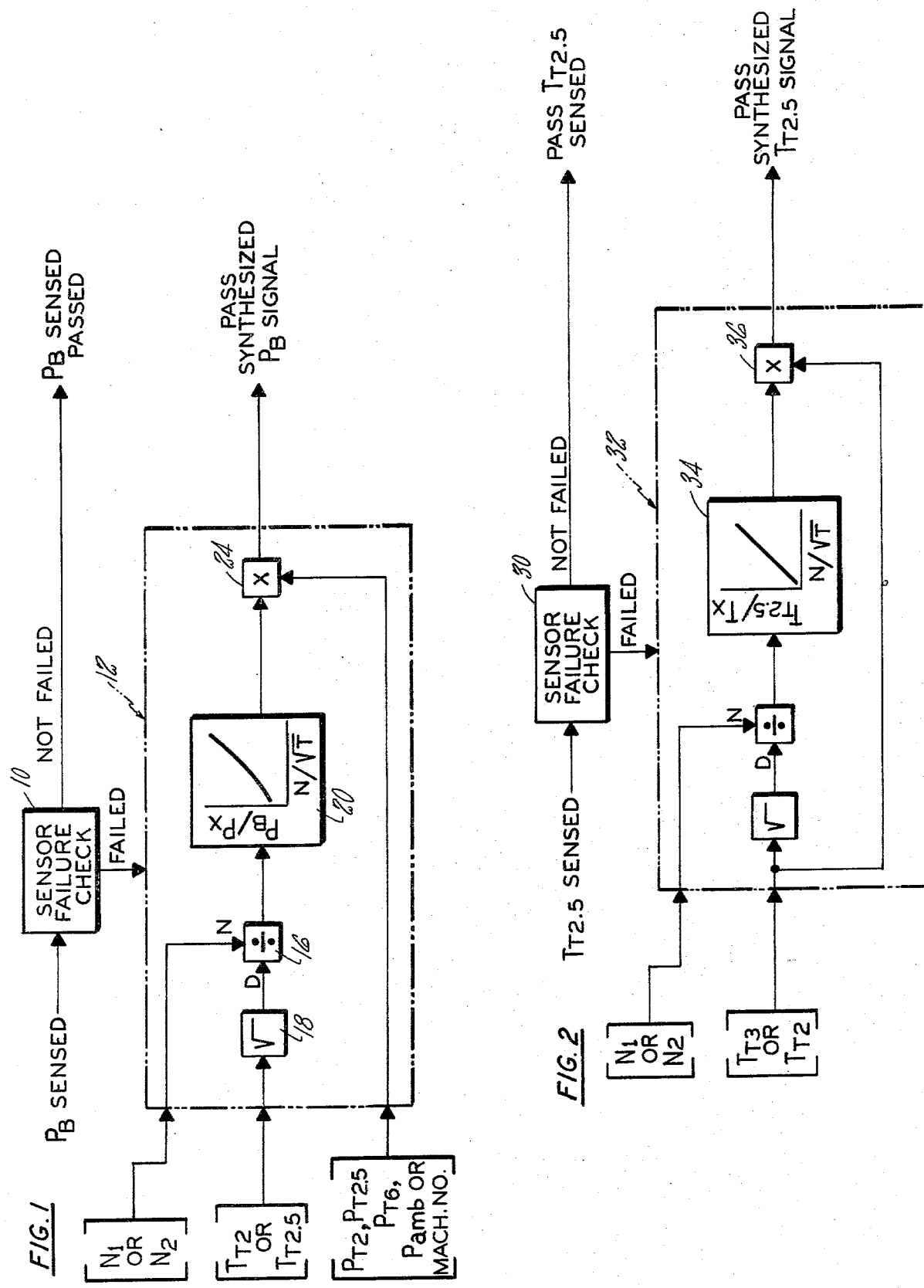

SIMULATED PARAMETER CONTROL FOR GAS TURBINE ENGINE

BACKGROUND OF THE INVENTION

This invention relates to controls for turbine type power plants and more particularly to means for synthesizing a failed sensor to avoid engine shutdown or damage.

The apparent consequence of a sensor which is no longer operating within its operating envelope in an engine control is failure or shutdown of the engine. Obviously, such a consequence is to be avoided if at all possible. Attempts have been made to account for failed sensors particularly as a result of the advent of digital computers. For example, U.S. Pat. No. 3,851,157 granted to S. H. Ellis on Nov. 26, 1974, and assigned to the same assignee, discloses a system that continuously performs mathematical calculations and applies a statistical analysis of sorts to ascertain the probability of sensor failure and means that would substitute for the failed sensor. Such a system is not only complex but is cumbersome to implement and at best it's a statistical approach to the correct answer.

I have found that I can increase failure tolerance of electronic controls by synthesizing many of the sensed engine parameters upon their failure. This invention contemplates generating a function that is indicative of the ratio of two engine parameters where one of those parameters include the term of the failed parameter. This ratio is then multiplied by a given engine parameter which has a given thermodynamic relationship in that particular engine cycle and the product is a synthesized value indicative of the failed sensor.

SUMMARY OF THE INVENTION

A feature of this invention is to provide for an electronic control for a gas turbine engine means for minimizing the effect of sensor failures and hence increasing the failure tolerance. As a feature of this invention, sensed engine parameters having a particular thermodynamic relationship in the engine cycle to the parameter monitored by the failed sensor are calculated to produce a synthesized signal indicative of the signal otherwise created by the failed sensor had it not failed. This system is characterized as being continuously on line, simple to implement and highly reliable.

Other features and advantages will be apparent from the specification and claims and from the accompanying drawings which illustrate an embodiment of the invention.

BRIEF DESCRIPTION OF THE DRAWINGS

FIG. 1 is a block diagram illustrating an example of the method for synthesizing the parameter produced by the failed sensor.

FIG. 2 is a block diagram illustrating another example of the utilizing of this concept to synthesize a sensed engine parameter that failed.

DESCRIPTION OF THE PREFERRED EMBODIMENT

It should be understood that this invention has application in all types of turbine power plants whether it be the axial flow multiple spool type as the F-100, manufactured by the Pratt & Whitney Aircraft division of United Technologies Corporation, or any other type. However, this invention is particularly effective in electronic controls for gas turbine engines. The parameters selected to be synthesized will depend on the parameters sensed by the engine control and the sophistication desired. Hence, as one skilled in the art will appreciate, the number of failures that can be satisfied is numerous and, hence, by way of description without limitation to the scope of the invention, the application will describe two examples where this invention was successfully applied.

As noted in FIG. 1, burner pressure (PB) is selected as an example for parameter synthesizing. A suitable meter, as represented by box 10, continuously monitors PB and will pass the signal so long as it hasn't failed. When the signal fails, it is sensed by any suitable sensing means, comparing the minimum and maximum limits of that signal and producing an error signal such as a voltage value whenever the sensed parameter is beyond its operating envelope. If the signal has failed, the synthesizing logic will be actuated. As shown, the sensing and calculation logic represented in box 12 can sense a host of valid engine parameters having a thermodynamic relationship. Thus, rotor speed (low compressor (N1)) or high compressor (N2) (in a twin spool engine) as the F-100 engine referenced above is sensed and applied to divider 16. The square root of compressor inlet, total temperature TT2 or intermediate compressor pressure TT2.5 is calculated by the square root computer 18 and the output thereof is applied to the function generator 20. Function generator 20 provides an output signal that is indicative of the ratio of PB and another engine parameter (PX) which may be total pressure at the compressor inlet (PT2) or the pressure intermediate the low and high compressors (PT2.5), total pressure at the augmentor (PT6), (when one is used) or ambient pressure (Pamb) and Mach # (Mn) for a given corrected speed ($N/\sqrt{T}$).

One of these pressures, depending on the denominator of the ratio selected whose function is generated, is applied to multiplier 24 where the product of the ratio PB/x is indicative of the synthesized PB signal which is then passed to the control to substitute for the failed sensed parameter.

FIG. 2 is an example where TT2.5 (a critical parameter in certain engines) is synthesized upon a failure of its sensor. As in FIG. 1, TT2.5 is continuously monitored by meter 30 and so long as it is operative, it is passed to the control where it is being utilized. A failure will actuate the synthesizing logic in box 32. Again, as in FIG. 1, corrected speed of N1 or N2 is calculated and applied to function generator 34 that generates a signal indicative of the ratio of TT2.5/Tx where Tx is either TT3 or TT2 where TT3 is total temperature at the discharge end of the compressor. The parameter in the denominator of the ratio is then sensed and multiplied in multiplier 36 by the output of function generator 34. The output of multiplier 34 is the synthesized TT2.5 parameter substituted for the failed sensed TT2.5 signal.

It should be understood that the invention is not limited to the particular embodiments shown and described herein, but that various changes and modifications may be made without departing from the spirit or scope of this novel concept as defined by the following claims.

I claim:

1. For a fuel control that meters fuel to a gas turbine engine having multiple compressor stages, means for providing a synthesized burner pressure signal to be substituted for a measured parameter indicative of the actual burner pressure in the event of failure of the signal indicative of said measured parameter whenever said signal falls outside the range of its normal operating limits comprising, a function generator responding to a signal indicative of the pressure intermediate said compressor stages which has a relationship to the thermodynamic cycle of said gas turbine engine for generating a first signal indicative of a ratio of two parameters where one of said two parameters is a function of burner pressure to be synthesized, means measuring still a different engine operating parameter which is mutually dependent on the measured parameter processed by said function generator for providing a second signal and means for combining said first signal and said second signal for producing an output signal whose value is approximate the signal indicative of actual burner pressure.

2. Means as in claim 1 wherein said combining means is a multiplier for multiplying said first signal by said second signal.

3. Means as in claim 1 wherein said function generator responds to temperature at the inlet of the compressor and compressor speed.

4. For a fuel control that meters fuel to a gas turbine engine, means for providing a synthesized burner pressure signal to be substituted for a measured parameter indicative of the actual burner pressure in the event of failure of the signal indicative of said measured parameter whenever said signal falls outside the range of its normal operating limits comprising, a function generator responding to a signal indicative of the pressure at the inlet of said engine which has a relationship to the thermodynamic cycle of said gas turbine engine for generating a first signal indicative of a ratio of two parameters where one of said two parameters is a function of burner pressure to be synthesized, means measuring temperature at the inlet of said engine which is mutually dependent on the measured parameter processed by said function generator for providing a second signal and means for combining said first signal and said second signal for producing an output signal whose value is approximate the signal indicative of actual burner pressure.

* * * * *